United States Patent
Maloney et al.

[11] Patent Number: 6,008,970
[45] Date of Patent: Dec. 28, 1999

[54] POWER SUPPLY CLAMP CIRCUITRY FOR ELECTROSTATIC DISCHARGE (ESD) PROTECTION

[75] Inventors: Timothy J. Maloney, Palo Alto; Wilson Kan, Cupertino, both of Calif.

[73] Assignee: Intel Corporation, Santa Clara, Calif.

[21] Appl. No.: 09/098,829

[22] Filed: Jun. 17, 1998

[51] Int. Cl.$^6$ ....................... H02H 9/00

[52] U.S. Cl. .............. 361/56; 361/111; 361/115; 361/118

[58] Field of Search ............... 361/56, 91, 111, 361/113, 115, 117, 118, 127

[56] References Cited

U.S. PATENT DOCUMENTS

| | | | |
|---|---|---|---|
| 5,173,755 | 12/1992 | Co et al. | 361/56 |
| 5,400,202 | 3/1995 | Metz et al. | 361/56 |
| 5,568,345 | 10/1996 | Mudd et al. | 361/56 |
| 5,719,737 | 2/1998 | Maloney | 361/111 |
| 5,784,242 | 7/1998 | Watt | 361/111 |
| 5,825,603 | 10/1998 | Parat et al. | 361/111 |
| 5,835,328 | 11/1998 | Maloney et al. | 361/111 |

OTHER PUBLICATIONS

Grove, A., *Physics and Technology of Semiconductor Devices,* John Wiley & Sons, Pubs., New York, Book cover and copyright information provided, p. 323, (1967).

Merrill, R., et al., "ESD Design Methodology", *Electrical Overstress/Electrostatic Discharge Symposium Proceedings,* 6 pages, (Sep. 28–30, 199).

Wann, C., et al., "High–Performance 0.07–um CMOS with 9.5–ps Gate Delay and 150 GHx ft", *IEEE Electron Device Letters, vol. 18, No. 12,* pp. 625–627, (Dec. 1997).

Worley, E.R., et al., "Sub–Micron Chip ESD Protection Schemes Which Avoid Avalanching Junctions", *EOS/ESD Symposium,* 9 pages, (Sep. 1995).

*Primary Examiner*—Stephen W Jackson
*Attorney, Agent, or Firm*—Schwegman, Lundberg Woessner & Kluth P.A.

[57] ABSTRACT

Circuitry is provided which increases the efficiency of electrostatic discharge (ESD) power supply clamping circuitry to sink larger currents during an ESD event on a power supply node. Voltage clamp circuits capable of providing ESD protection to a supply node are described. The voltage clamp circuits include a discharge transistor which is controlled by a control circuit during an ESD event. The control circuit operates in response to a voltage provided on the protected supply node. One embodiment provides a P-channel MOS transistor and a control circuit which drives the gate of the transistor. Another embodiment provides an N-channel MOS transistor and a control circuit which drives the gate of the transistor.

27 Claims, 8 Drawing Sheets

POWER SUPPLY CLAMP CIRCUITRY FOR ELECTROSTATIC DISCHARGE (ESD) PROTECTION

FIELD OF THE INVENTION

The present invention relates generally to electrostatic discharge protection and in particular the present invention relates to protection circuitry for sinking current during an electrostatic discharge.

BACKGROUND OF THE INVENTION

Integrated circuits (ICs) are typically manufactured with external connections for receiving either power supply, control or communication connections with external devices or systems. The trend in fabricating ICs is to increase the density of internal components, such as transistors and interconnects. In addition, the power supply potential used to operate the integrated circuits continues to decrease.

As integrated circuit devices increase in density and operating supply voltages decrease, the integrated circuits become more sensitive to the effects of electrostatic discharge. Electrostatic discharge (ESD) refers to the phenomenon of electrical discharge of high current for a short time duration resulting from a build up of static charge on a particular integrated circuit package, or on a nearby human handling that particular IC package. ESD is a serious problem for semiconductor devices since it has the potential to destroy an entire IC. Because ESD events occur often across the silicon circuits attached to IC package terminals, circuit designers have concentrated their efforts on developing adequate protection mechanisms for these sensitive circuits.

One solution is the use of a grounded gate transistor as a simple ESD protection circuit. The transistor is configured as a diode and has a drain junction breakdown voltage lower than the gate dielectric breakdown voltage. While this circuit provides some protection from ESD events, it cannot pass the large currents inherent to some ESD events. An ESD protection circuit should be able to protect an IC against any conceivable static discharge by non-destructively passing large currents through a low impedance path in a short time.

One difficulty in designing ESD protection circuits is the demanding performance requirements that must be met. For example, one of the primary industry standards for measuring ESD robustness (MIL-STD-883C method 3015.7 Notice S (1989), and its follow-on Human Body Model (HBM) standard No. 5.1 (1993) from the EOS/ESD Association) requires ESD testing on a large number of pin and power supply combinations. In the past, ESD protection circuits have had difficulty meeting these stringent requirements while maintaining adequate noise immunity.

Integrated circuits have come under pressure in HBM tests because of repeated stressing of the power supply rails, leading to wear out of various breakdown points, such as an upper voltage supply, Vcc, line. A reliable power supply clamp is needed to reduce the susceptibility of the Vcc bus to failure mechanisms related to ESD testing. Further, ESD protection of input and output pins becomes simpler with a reliable power supply clamp because ESD current can be routed to one supply or another.

A p-channel field effect transistor (PFET) power supply clamp is described in U.S. patent application Ser. No. 08/823,109, filed Mar. 24, 1997 entitled "MOSFET-based Power Supply Clamps for Electrostatic Discharge Protection of Integrated Circuits." This clamp circuit uses a PFET to provide a discharge path through the transistor for the electrostatic voltage. A gate of the transistor is pulled close to ground during an ESD event. A threshold drop, therefore, is experienced across the transistor. Thus, the transistor does not dissipate the maximum possible current from the supply node.

For the reasons stated above, there is a need in the art for a circuit which increases the area efficiency of ESD power supply clamping circuitry to sink larger currents during an ESD event.

SUMMARY OF THE INVENTION

In one embodiment, the present invention describes a power supply clamping circuit comprising a switchable current sinking device connected to a power supply node, and a control circuit. The control circuit is coupled to a control connection of the switchable current sinking device, and adapted to provide a control voltage tc the control connection during an electrostatic discharge event on the power supply node. The control voltage has a potential which is outside of a voltage range of an externally provided voltage supply.

In another embodiment, a power supply clamping circuit comprises a transistor connected to a power supply node, and a control circuit coupled to a gate of the transistor. The control circuit is adapted to provide a control voltage to the gate during an electrostatic discharge event on the power supply node. The control voltage provides a discharge path through the transistor which is not limited to a threshold voltage drop across the transistor.

In yet another embodiment, an integrated circuit comprises a power supply node for receiving a power supply voltage, internal circuitry for performing a predetermined function, and a power supply clamping circuit for providing a discharge path during an electrostatic discharge event on the power supply node. The power supply clamping circuit comprises a transistor connected to the power supply node, and a control circuit coupled to a gate of the transistor. The control circuit is adapted to provide a control voltage to the gate of the transistor, while the control voltage provides a discharge path through the transistor which is not limited to a threshold voltage drop across the transistor.

DETAILED DESCRIPTION OF THE INVENTION

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

Figure 1:
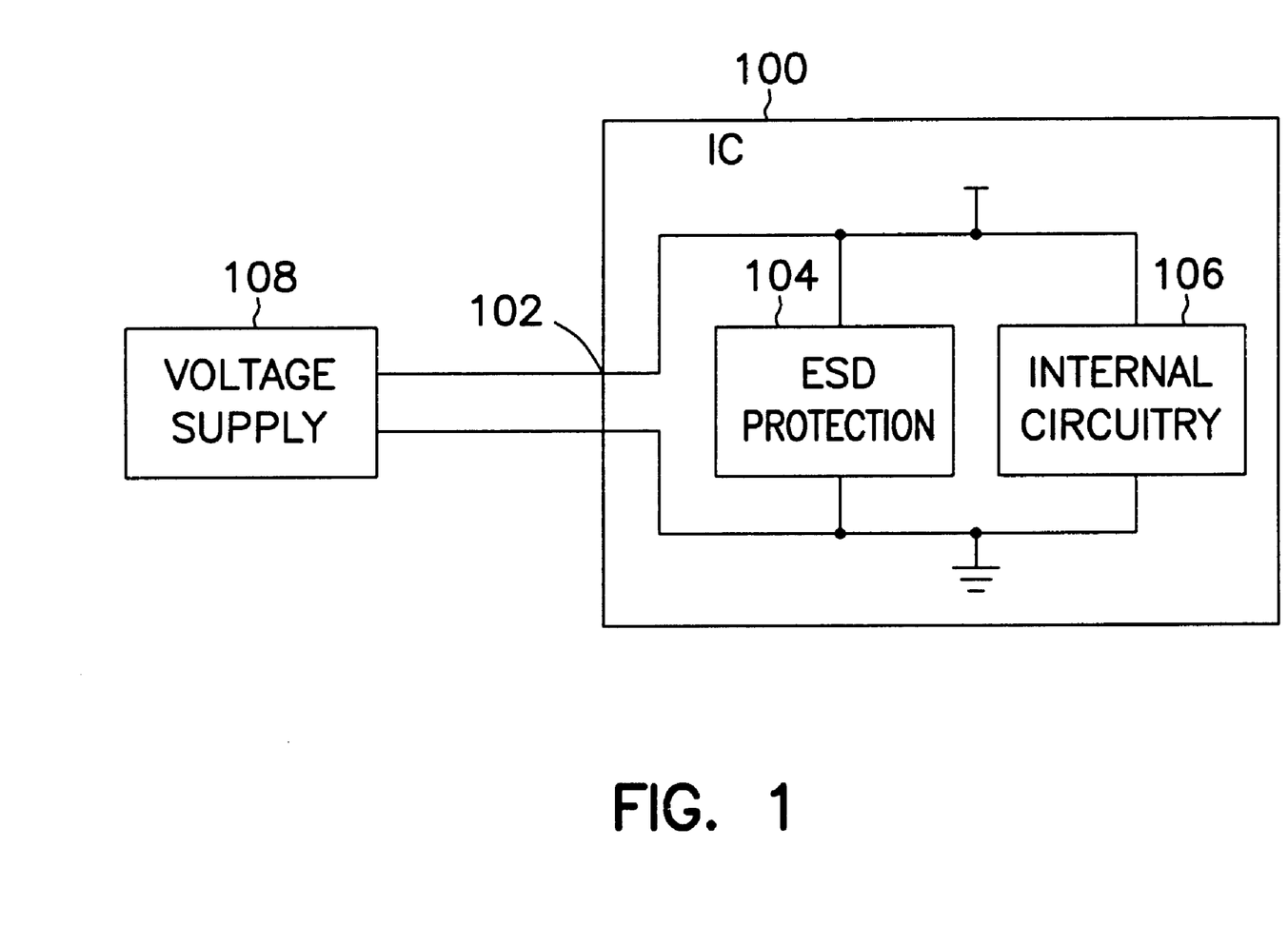
FIG. 1 is a block diagram of an integrated circuit according to one embodiment of the present invention.

An embodiment of the present invention provides clamping circuitry for use in electrostatic discharge where PMOS discharge transistors are provided for sinking large currents to improve protection during ESD events. FIG. 1 is a block diagram of an integrated circuit 100 which has a voltage supply input connection 102 for receiving an externally provided high supply voltage from voltage supply circuit 108. An ESD protection circuit 104 is provided to protect internal circuitry 106, designed to perform a predetermined function. The protection circuitry is described in detail below. The integrated circuit 100 can be any type of integrated circuit which receives a supply voltage, including, but not limited to, processors, controllers, memory devices, and application specific integrated circuits (ASIC). The ESD protection works to protect the internal circuitry when the integrated circuit is being handled, or when the integrated circuit is installed and powered up.

Figure 2:
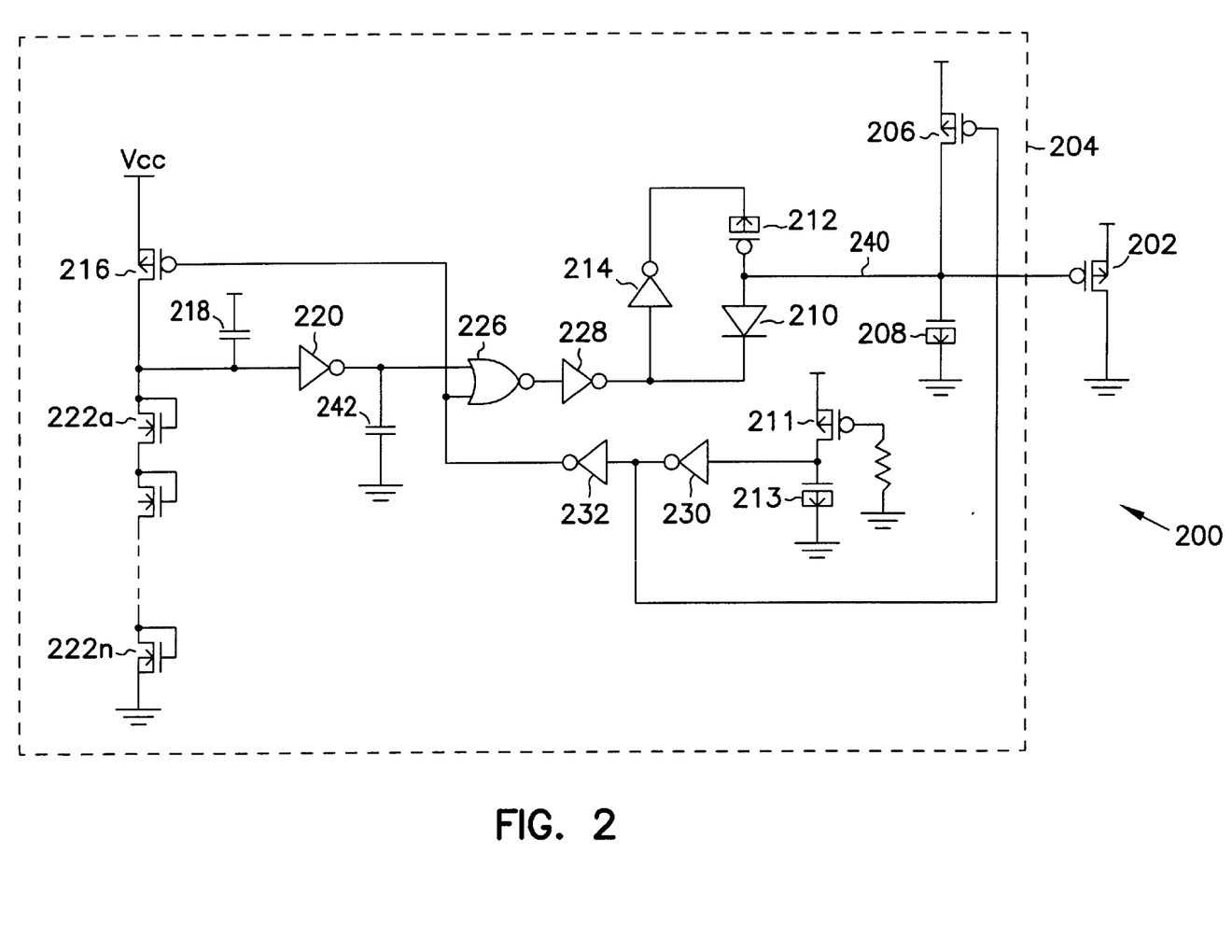
FIG. 2 is a clamp circuit having a PMOS transistor and a NOR based control circuit.

Referring to FIG. 2 one embodiment of a clamp circuit 200 is illustrated which employs the present invention. The clamp circuit uses a single PMOS transistor 202, or switchable current sinking circuit, which is coupled to a control circuit 204. The control circuit is adapted to pull the gate of transistor 202 below ground during an ESD event to increase current sinking.

If an ESD event is experienced on the power supply node, Vcc, when the integrated circuit is being handled or tested (no power applied), the input of inverter 220 is pulled high by the ESD voltage pulse through capacitor 218. It will be appreciated that capacitor 218 should be small so that the input of inverter 220 can fall quickly through series coupled transistors 222a–n as the voltage on the Vcc connection rises, explained in greater detail below. One input of NOR gate 226, therefore, is pulled low by inverter 220. The second input to the NOR gate is also coupled low by inverter 230 and capacitor 213. With the output of the NOR gate high, inverter 214 charges capacitor 212. It is noted that inverter 230 also turns transistor 206 off.

As the voltage on the Vcc connection rises, series coupled transistors 222 discharge capacitor 218 and toggle the output of inverter 220 to a high state as a trigger voltage is reached. The output of NOR gate 226, therefore, transitions to a low state in response to the change in the output of inverter 220. Inverters 228 and 214 also change states. Thus, diode 210 is decoupled from ground (reverse biased), and capacitor 212 is coupled to ground, one inverter delay later. An RC network is formed by transistor 211 and capacitor 213. Over a greater time period, microseconds, the RC network holds both the input of inverter 230 and the second input of NOR gate 226 to a high state. The RC network also controls the gate of p-channel transistor 202 (via transistor 206) during non-ESD events, to place the p-channel transistor in a low current state.

Capacitor 212 is operated as a pump capacitor which forces node 240 and the gate of transistor 202 to a negative voltage in response to inverter 214. The voltage on node 240 can be viewed as a control voltage which is coupled to the gate of transistor 202 during an electrostatic discharge event on the power supply node. Transistor 202, therefore, is driven as hard as possible, limited only by the P+ junction breakdown voltage. The PMOS clamp circuit 200, therefore, couples the gate of a discharge transistor to a negative voltage during an ESD event such that a threshold voltage (Vt) drop is not experienced through transistor 202.

It is noted that diode 210 and capacitor 212, controlling the gate of transistor 202, flip at three and four gate delays after a trigger voltage is reached during an ESD event, respectively. As gate delays become shorter with respect to the ESD time scale, these gate delays becomes more tolerable.

When the integrated circuit is in a steady state mode, that is, when ti-e integrated circuit is powered up and stabilized, capacitor 213 is charged and inverter 232 provides a high input to NOR gate 226. Very weak transistor 206 has charged capacitors 208 and 212 and keeps transistor 202 turned off. Transistors 222a–222n pull the input of inverter circuit 220 low to provide a high output. Thus, both inputs of NOR gate 226 are coupled high.

If an ESD pulse is experienced on the Vcc connection while the circuit is in a steady state mode, both inputs of the NOR gate 226 transition low and the capacitor nodes coupled to node 240 are discharged through diode 210. Likewise, inverter 214 charges the node of capacitor 212 coupled to its output. After transistors 222 pull the input of inverter 220 low, inverter 214 pumps capacitor 212 to force node 2410 below ground, as explained above. This provides a high current discharge path for the ESD pulse.

Figure 3:
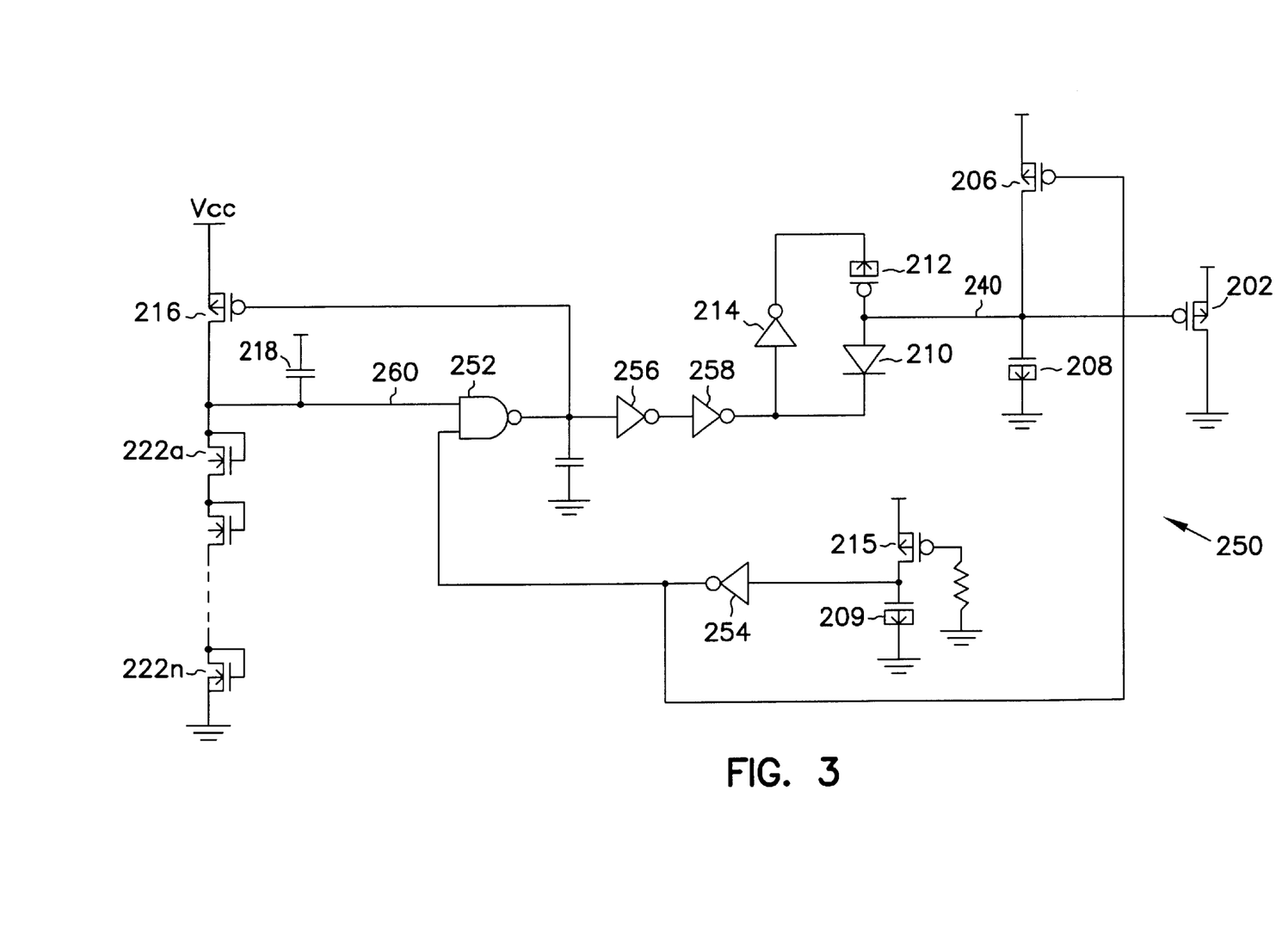
FIG. 3 is a clamp circuit having a PMOS transistor and a NAND based control circuit.

FIG. 3 is a clamp circuit 250 similar to clamp circuit 200 of FIG. 2, but adapted to use a NAND gate 252 in place of the described NOR gate 226. If an ESD event is experienced on the Vcc connection when the integrated circuit is being handled or tested (no power applied), the output of the NAND gate is initially low as a result of capacitor 218 and inverter 254. Capacitor 212, therefore, is charged through inverter series 256, 258 and 214 and diode 210. As the voltage on the Vcc connection rises, series coupled transistors 222 discharge capacitor 218 and toggle the output of NAND gate 252 to a high state. Inverters 256, 258 and 214 also change states. Thus, diode 210 is reverse biased, and capacitor 212 is coupled to ground, one inverter delay later.

Capacitor 212 forces node 240 and the gate of transistor 202 to a negative voltage in response to inverter 214. Transistor 202, therefore, is driven as lard as possible, limited only by the P+ junction breakdown voltage. The PMOS c(lamp circuit 250, therefore, couples the gate of the discharge transistor to a negative voltage during an ESD event such that a threshold voltage (Vt) drop is not experienced through transistor 202. An RC network is formed by transistor 215 and capacitor 209. Over a greater time period, microseconds, the RC network holds the input of inverter 254 high and the second input of NAND gate 252 low. The RC network also controls the gate of p-channel transistor 202 (via transistor 206) during non-ESD events, to place the p-channel transistor in a low current state.

Similar to circuit 200, diode 210 and capacitor 212 flip at three and four gate delays after a trigger voltage is reached during an ESD event, respectively. The gate delay of NAND gate 252, however, is greater than that of NOR gate 226. Further, the NAND gate must be designed to trip at a critical voltage, instead of inverter 220.

Figure 4:
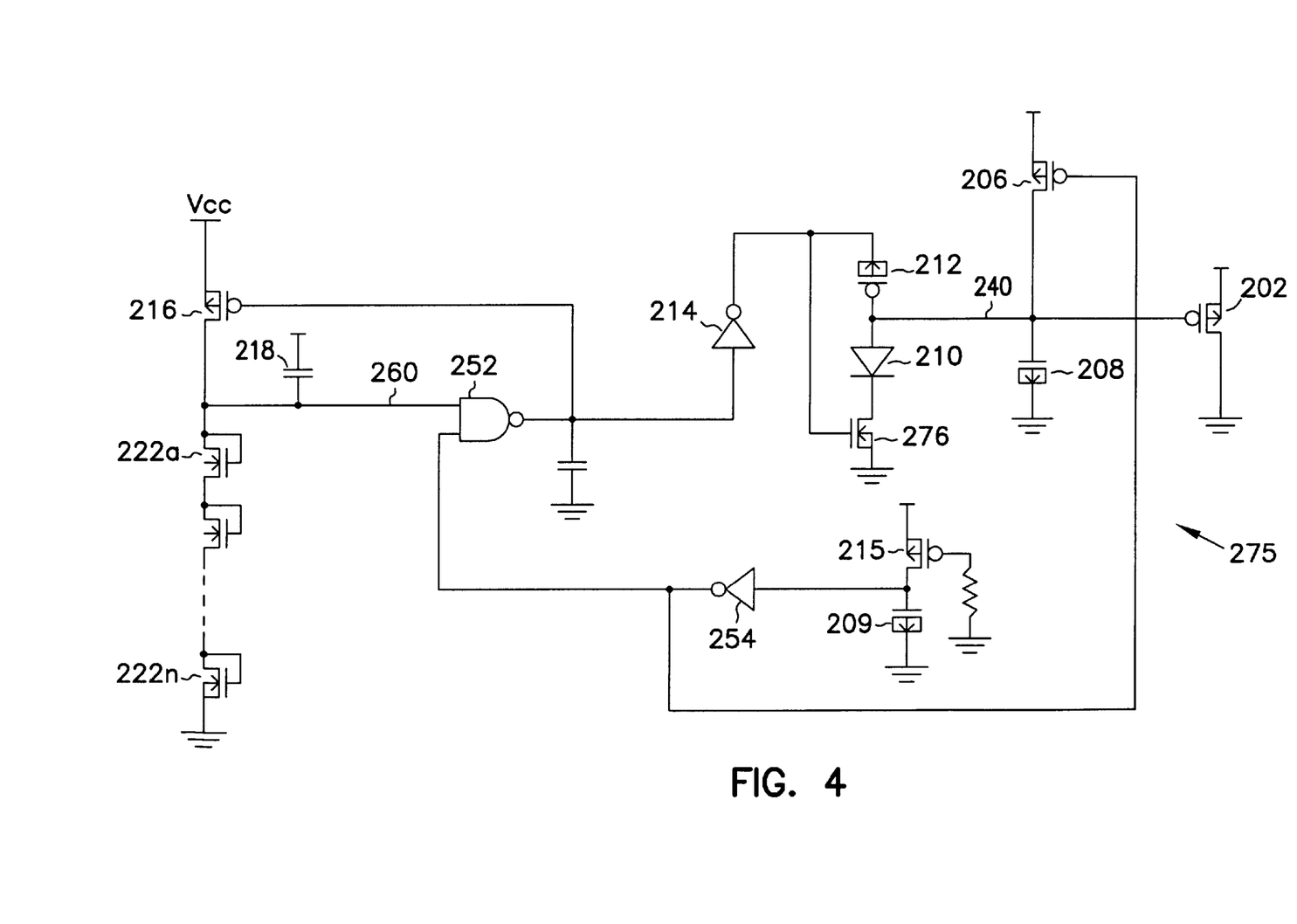
FIG. 4 is an alternate clamp circuit having a PMOS transistor and a NAND based control circuit.

The transition of diode 210 from forward bias to reverse bias can create problems for negative gate bias as a result of charge storage in the diode. Diode 210 only requires is that its cathode be grounded or floating. Thus, a clamp circuit 275, similar to clamp circuit 250 of FIG. 3, is illustrated in FIG. 4. The cathode of diode 210 is coupled to a pull-down transistor 276 which is controlled by the output of inverter 214. Thus, inverter 214 both charges capacitor 212 and controls the bias of transistor 276. If the timing of transistor 276 with respect to capacitor 212 is a problem, a small inverter can be added in parallel to inverter 214 to drive transistor 276. It is noted that inverters 256 and 258 have been eliminated because the NAND gate does not need to control the diode bias.

Figure 5:
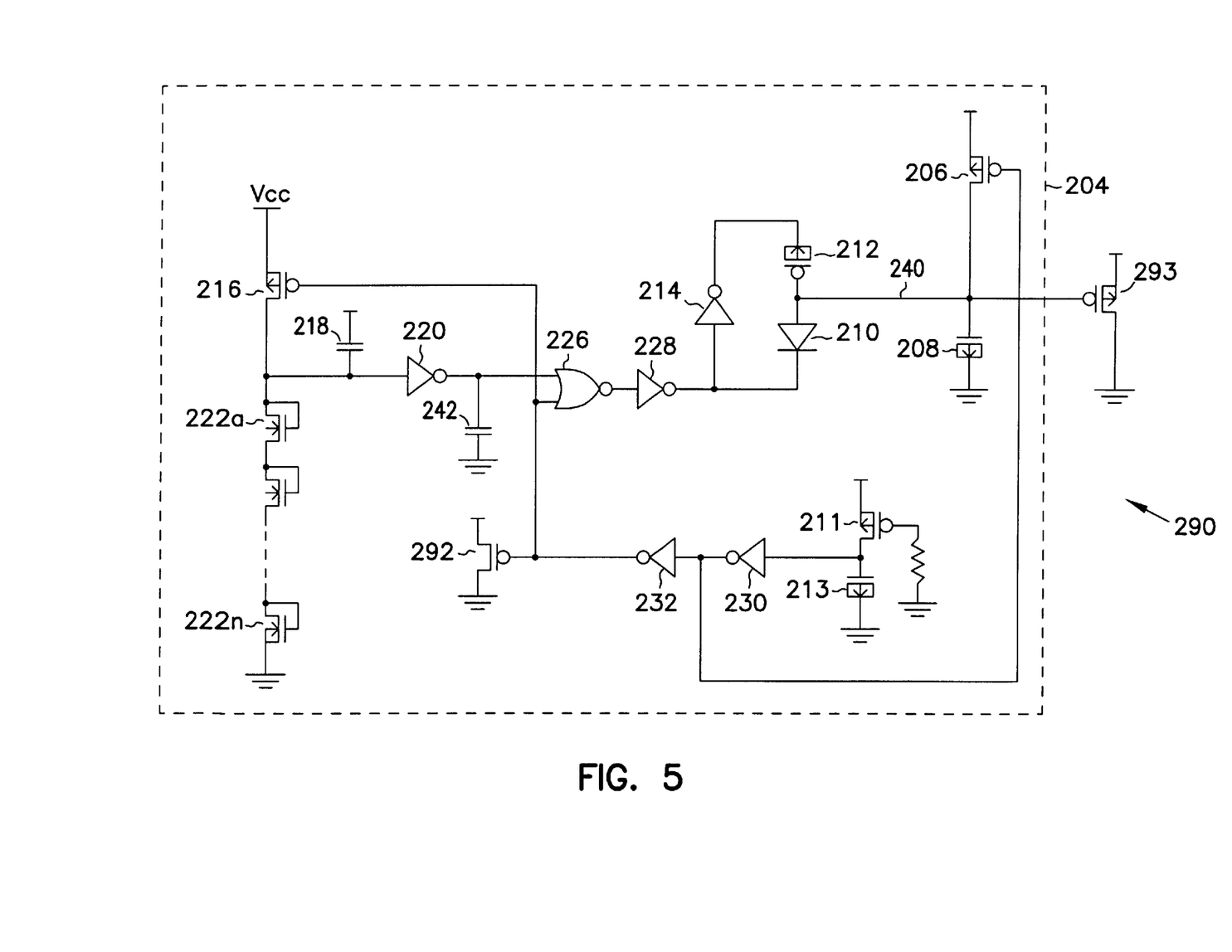
FIG. 5 is a clamp circuit having a PMOS transistor and a NOR based control circuit.

Because the initial state of the PMOS transistor 202 in FIG. 2 is a diode drop or more above ground, there can be an initial undesirable voltage spike experienced when the gate connection goes to ground. To reduce this problem, the function of transistor 202 can be split between two transistors 292 and 293, as illustrated in clamp circuit 290 of FIG. 5. The circuit operates in a similar manner to clamp circuit 200, but reduces the initial voltage spike by including transistor 292. The gate of transistor 292 is not driven to a negative voltage like transistor 293, but does provide an initial current path prior to the change in the gate voltage of transistor 293. Inverters 230 and 232 are scaled up to drive the gate of transistor 292. It will be appreciated that transistors 292 and 293 can be fabricated with common source and drain regions to conserve die area.

Figure 6:
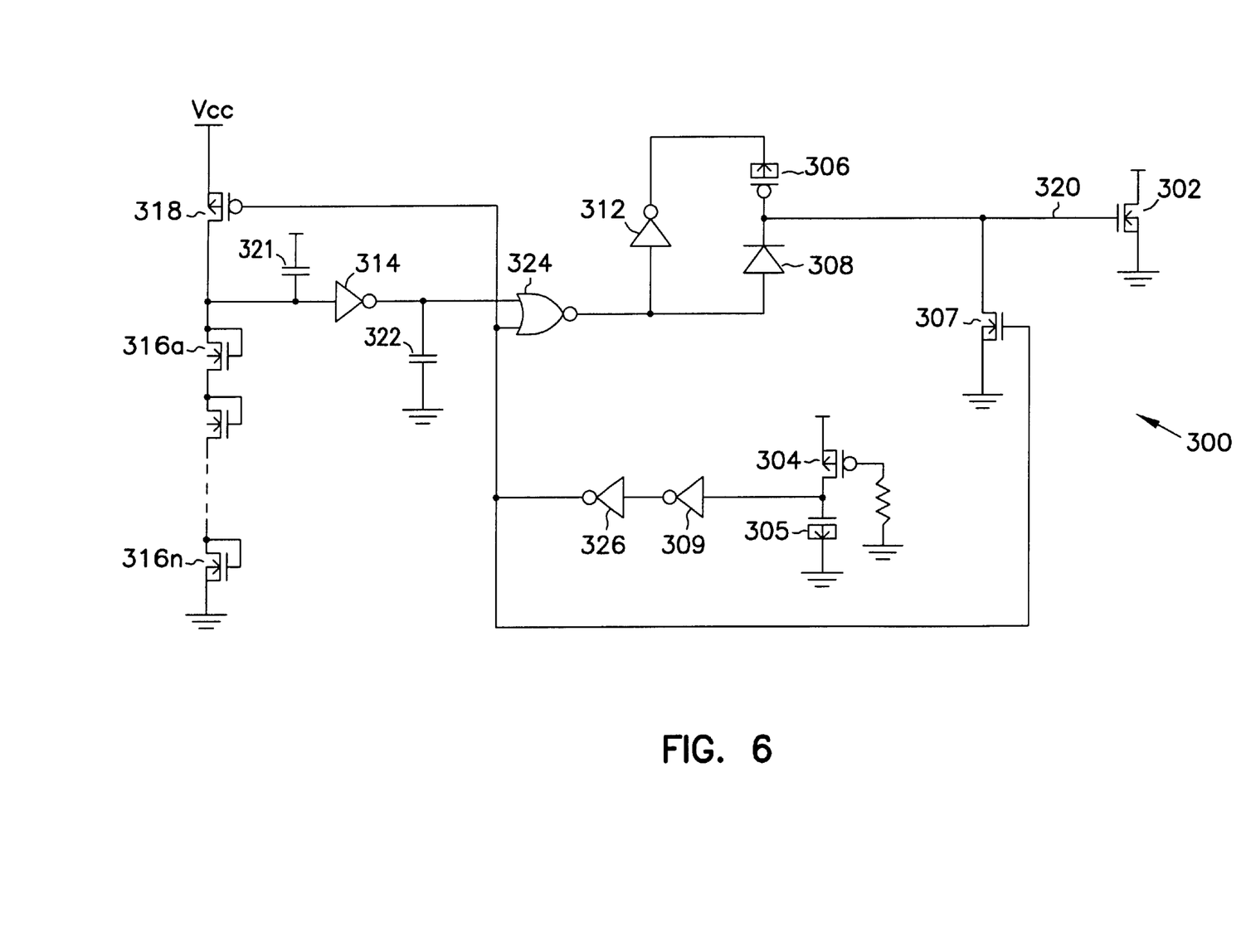
FIG. 6 is a clamp circuit having a NMOS transistor and a NOR based control circuit.

FIG. 6 illustrates one embodiment of a clamp circuit 300 employing a large NMOS transistor 302 as a switchable current sinking circuit. The transistor gate, node 320, is coupled to control circuitry for driving the gate to a pumped voltage during ESD events to increase current sinking.

If an ESD event is experienced on a power supply node when the integrated circuit is being handled or tested (no power applied), the input of inverter 314 is pulled high by the ESD voltage pulse through capacitor 321. It will be appreciated that capacitor 321 should be small so that the input of inverter 314 can fall quickly through series coupled transistors 3 16a–n as the voltage on the Vcc connection rises, as explained below. One input of NOR gate 324, therefore, is pulled low by inverter 314. The second input of the NOR gate is coupled low by inverter 326 and capacitor 305. With the output of the NOR gate high, inverter 312 charges capacitor 306. Inverter 326 also turns transistor 307 off.

As the voltage on the Vcc connection rises, series coupled transistors 316 discharge capacitor 321 and toggle the output of inverter 314 to a high state as a trigger voltage is reached. The output of NOR gate 324, therefore, transitions to a low state in response to the change in the output of inverter 314. Diode 308 is reverse biased, and inverter 312 change states to couple capacitor 306 to the Vcc node.

Capacitor 306 is operated as a pump capacitor which forces node 320 and the gate of transistor 302 to a pumped positive voltage in response to inverter 312. The voltage on node 320 can be viewed as a control voltage which is coupled to the gate of transistor 302 during an electrostatic discharge event on the power supply node. Transistor 302, therefore, is driven as hard as possible, limited only by the junction breakdown voltage. The NMOS clamp circuit 300, therefore, couples the gate of the discharge transistor to a pumped positive voltage during an ESD event such that a threshold voltage (Vt) drop is not experienced through transistor 302. Because the circuit is intended to operate using a predefined range for Vcc, the gate volt-age on transistor 302 can be defined as having a potential which is outside of a voltage range of an externally provided voltage supply during an ESD event. Specifically, tie transistor gate control voltage has a positive potential greater than an upper supply voltage, Vcc, as defined during normal, non-ESD operation.

It is noted that diode 308 and capacitor 306, controlling the gate of transistor 302, flip at two and three gate delays after a trigger voltage is reached during an ESD event, respectively. As gate delays become shorter with respect to the ESD time scale, these gate delays becomes more tolerable. An RC network is formed by transistor 304 and capacitor 305. Over a greater time period, microseconds, the RC network holds both the input of inverter 309 and the second input of NOR gate 324 to a high state. The RC network also controls the gate of n-channel transistor 302 (via transistor 307) during non-ESD events, to place the n-channel transistor in a low current state.

If an ESD pulse is experienced on Vcc in the steady state mode, both inputs of the NOR transition low and the capacitor node coupled to inverter 312 is discharged. Diode 308 charges the node of capacitor 306 coupled to its cathode. After transistors 316 pull the input of inverter 314 low, inverter 312 pumps capacitor 306 to force node 320 to a pumped positive voltage, as explained above. This provides a high current discharge path for the ESD pulse.

Figure 7:
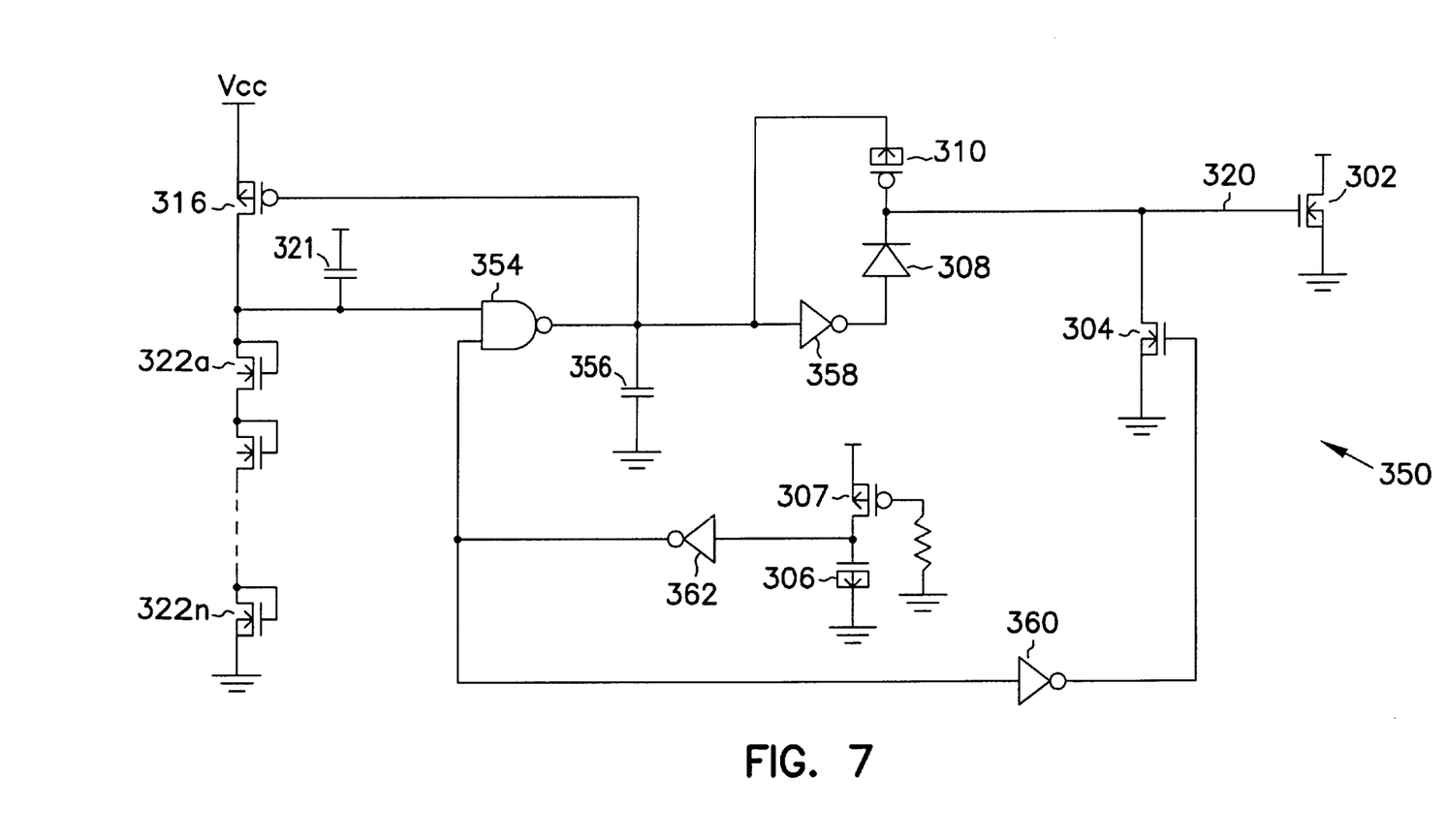
FIG. 7 is a clamp circuit having a NMOS transistor and a NAND based control circuit.

FIG. 7 is a clamp circuit 350 similar to clamp circuit 300 of FIG. 6, but adapted to use a NAND gate 354 in place of the described NOR gate 324. The initial bias of node 320 remains the same as that of FIG. 6. The clamp circuit is designed in substantially the same manner as clamp circuit 300, however, inverters have been eliminated or changed in accordance to the requirements of NAND gate 354. This embodiment flips capacitor 310 and diode 308 at one and two gate delays after a trigger voltage is reached during an ESD event, respectively. Note that the timing of the diode flip and capacitor flip have changed. An embodiment of the clamp, however, can be provided which has the same basic timing of FIG. 6. Again, the gate delay of a NAND gate is greater than that of a NOR gate. Further, the NAND gate must be designed to trip at a critical voltage, instead of inverter 314 of FIG. 6.

Figure 8:
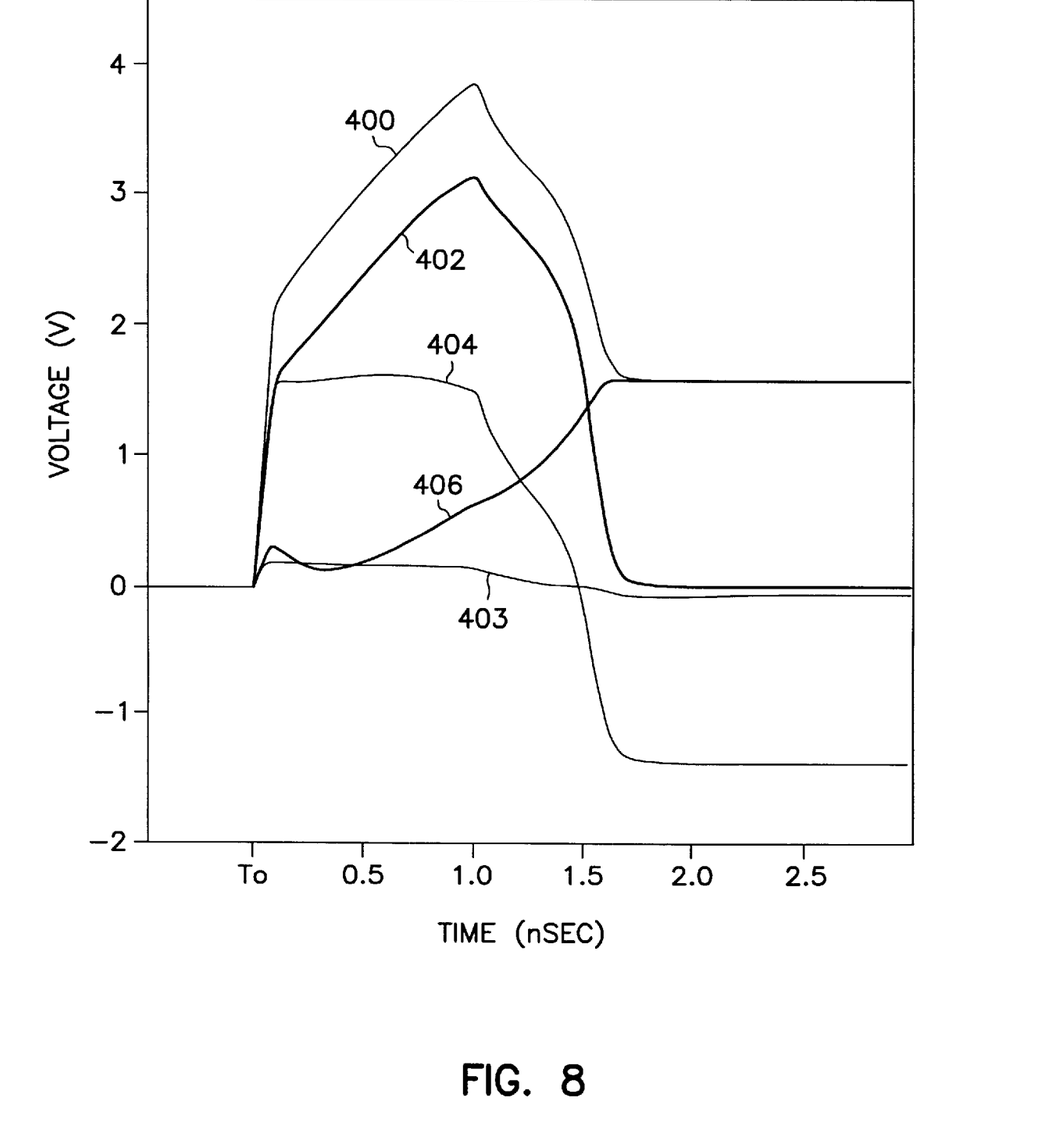
FIG. 8 is a simulation diagram of the circuit of FIG. 4 during an ESD event.

FIG. 8 is a diagram of the voltages experienced during an ESD event by clamp circuit 275 of FIG. 4. The ESD event is defined by a 80 volt pulse with a 1 ns rise time that is coupled to the Vcc node through 56 ohms. Line 400 illustrates the voltage resulting on the Vcc node. Line 402 is the output of inverter 214, and line 403 is the cathode of diode 210. Line 406 is the output of NAND gate 252, and the gate of transistor 202 (node 240) is illustrated as line 404. At time T0 an 80 volt spike is begun on Vcc (with 1 nsec rise time), and node 240 and the output of inverter 214 are coupled high. The output of NAND gate 252 is held low for one nanosecond. During this time, node 240 is clamped and capacitor 212 is charged by inverter 214. The cathode of diode 210 is coupled to ground through transistor 276. After one nanosecond, the output of NAND gate 252 is high enough to trigger inverter 214, and the gale of transistor 202 is driven below ground by the change on capacitor 212. The clamping circuit, therefore, clamps the Vcc connection during an ESD event by driving the gate of the pull-down transistor 202 to a negative level.

A variety of voltage clamp circuits capable of providing ESD protection to a supply node have been described. This circuitry increases the efficiency of ESD power supply clamping circuitry to sink larger currents during an ESD event. The voltage clamp circuits include a discharge transistor which is controlled by a control circuit such that a threshold voltage drop is not experienced across the discharge transistor during an ESD event. The various embodiments of the control circuit operate in response to a voltage provided on the protected supply node. One embodiment provides a P-channel MOS transistor and a control circuit which drives the gate of the transistor to ground or a negative voltage. Another embodiment provides an N-channel MOS transistor and a control circuit which drives the gate of the transistor to a pumped voltage which is above a positive supply voltage Vcc. Thus, the control voltage is preferably outside of a voltage range of the protected voltage supply node.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A power supply clamp circuit comprising:
    a switchable current sinking circuit connected to a power supply node; and
    a control circuit coupled to a control connection of the switchable current sinking circuit, the control circuit adapted to provide a control voltage to the control connection during an electrostatic discharge event on the power supply node, the control voltage having a potential which is outside of a voltage range of an externally provided power supply.

2. The power supply clamp circuit of claim 1 wherein the control voltage has a negative potential in response to the electrostatic discharge event on the power supply node.

3. The power supply clamp circuit of claim 1 wherein the control voltage develops a positive potential greater than a potential on a Vcc node of the power supply clamp circuit during the electrostatic discharge event.

4. A power supply clamp circuit comprising:
    a transistor connected to a power supply node; and
    a control circuit coupled to a gate of the transistor, the control circuit adapted to provide a control voltage to the gate during an electrostatic discharge event on the power supply node, the control voltage providing a discharge path through the transistor which is limited neither by a threshold voltage drop across the transistor, nor by a voltage at either a source or drain of the transistor.

5. The power supply clamp circuit of claim 4 wherein the control circuit comprises a pump capacitor coupled to the gate of the transistor.

6. The power supply clamp circuit of claim 4 wherein the transistor is an n-channel field effect transistor and the control voltage is greater than a supply voltage, Vcc.

7. The power supply clamp circuit of claim 4 wherein the transistor is a p-channel field effect transistor and the control voltage is a negative voltage.

8. The power supply clamp circuit of claim 4 wherein the control circuit provides the control voltage two or more gate delays after a trigger voltage is reached during an electrostatic discharge event.

9. A power supply clamp circuit comprising:
    a p-channel transistor connected between a power supply node and ground for providing a discharge path during an electrostatic discharge event on the power supply node; and
    a control circuit coupled to a gate of the p-channel transistor, the control circuit adapted to provide a negative potential control voltage to the gate of the p-channel transistor during the electrostatic discharge event.

10. The power supply clamp circuit of claim 9 wherein the control circuit comprises:
    a capacitor having a first terminal coupled to the gate of the p-channel transistor; and
    logic circuitry coupled to a second terminal of the capacitor for driving the second terminal to a low voltage.

11. The power supply clamp circuit of claim 9 wherein the control circuit comprises:
    a diode having an anode coupled to the gate of the p-channel transistor and a cathode coupled to a pull-down transistor;
    a pump capacitor having a first terminal coupled to the gate cf the p-channel transistor;
    a NAND gate having an input coupled to the power supply node via a capacitor; and
    a first inverter having an input coupled to an output of the NAND gate and an output coupled to both a second terminal of the pump capacitor, and a gate of the pull-down transistor.

12. The power supply clamp circuit of claim 9 wherein the control circuit comprises:
    a diode having an anode coupled to the gate of the p-channel transistor;
    a pump capacitor having a first terminal coupled to the gate of the p-channel transistor;
    a NOR gate having a first input node driven by an RC network;
    a first inverter having an input node coupled to the power supply node via a capacitor and an output node coupled to a second input node cf the NOR gate;
    a second inverter having an input node coupled to an output node of the NOR gate and an output node coupled to a cathode of the diode;
    a third inverter having an input node coupled to an output node of the second inverter and an output node coupled to a second terminal of the pump capacitor; and
    a second p-channel transistor connected between the power supply node and ground for providing a second discharge path, the second p-channel transistor having a gate connection coupled to the first input node of the NOR gate.

13. The power supply clamp circuit of claim 9 wherein the control circuit comprises:
    a diode having an anode coupled to the gate of the p-channel transistor;
    a pump capacitor having a first terminal coupled to the gate of the p-channel transistor;
    a NOR gate;
    a first inverter having an input node coupled to the power supply node via a capacitor and an output node coupled to an input node of the NOR gate;
    a second inverter having an input node coupled to an output node of the NOR gate and an output node coupled to a cathode of the diode; and
    a third inverter having an input node coupled to an output rode of the second inverter and an output node coupled to a second terminal of the pump capacitor.

14. The power supply clamp circuit of claim 9 wherein the control circuit comprises:

a diode having an anode coupled to the gate of the p-channel transistor;

a pump capacitor having a first terminal coupled to the gate of the p-channel transistor;

a NAND gate having an input node coupled to the power supply node via a capacitor;

a first inverter having an input node coupled to an output node of the NAND gate;

a second inverter having an input node coupled to an output node of the first inverter and an output node coupled to a cathode of the diode; and a third inverter having an input node coupled to an output node of the second inverter and an output node coupled to a second terminal of the pump capacitor.

15. The power supply clamp circuit of claim 9 wherein the control circuit comprises:

an RC network coupled to control the p-channel transistor during non-ESD events, to place the p-channel transistor in a low current state.

16. A power supply clamp circuit comprising:

an n-channel transistor connected between a power supply node and ground for providing a discharge path during an electrostatic discharge event on the power supply node; and a control circuit coupled to a gate of the n-channel transistor, the control circuit adapted to provide a control voltage to the gate of the n-channel transistor during the electrostatic discharge event which is greater than a supply voltage potential.

17. The power supply clamp circuit of claim 16 wherein the control circuit comprises:

a capacitor having a first terminal coupled to the gate of the n-channel transistor; and logic circuitry coupled to a second terminal of the capacitor for driving the second terminal to a high voltage.

18. The power supply clamp circuit of claim 16 wherein the control circuit comprises:

a diode having an cathode coupled to the gate of the n-channel transistor;

a pump capacitor having a first terminal coupled to the gate of the n-channel transistor;

a NOR gate having an output node coupled to an anode of the diode;

a first inverter having an input node coupled to the power supply node via a capacitor and an output node coupled to an input node of the NOR gate; and a second inverter having an input node coupled to the output node of the NOR gate and an output node coupled to a second terminal of the pump capacitor.

19. The power supply clamp circuit of claim 16 wherein the control circuit comprises:

a diode having a cathode coupled to the gate of the n-channel transistor;

a pump capacitor having a first terminal coupled to the gate of the n-channel transistor;

a NAND gate having an input node coupled to the power supply node via a capacitor and an output node coupled to a second terminal of the pump capacitor; and a first inverter having an input node coupled to the output node of the NAND gate and an output node coupled to an anode of the diode.

20. The power supply clamp circuit of claim 16 wherein the control circuit comprises:

an RC network coupled to control the n-channel transistor during non-ESD events, to place the n-channel transistor in a low current state.

21. An integrated circuit comprising:

a power supply node for receiving a power supply voltage;

internal circuitry for performing a predetermined function; and a power supply clamp circuit for providing a discharge path during an electrostatic discharge event on the power supply node, the power supply clamp circuit comprising, a transistor connected to the power supply node, and a control circuit coupled to a gate of the transistor, the control circuit adapted to provide a control voltage to the gate of the transistor which has a potential which is outside of a voltage range of an externally provided voltage supply.

22. The integrated circuit of claim 21 wherein the transistor is an n-channel field effect transistor and the control voltage is above a voltage which the power supply node becomes clamped.

23. The integrated circuit of claim 21 wherein the transistor is a p-channel field effect transistor and the control voltage is a negative voltage.

24. The integrated circuit of claim 21 wherein the integrated circuit is a processor circuit.

25. A method of discharging an electrostatic discharge pulse in an integrated circuit, the method comprising:

providing a control voltage during an electrostatic discharge event, the control voltage has a potential which is outside of a usual voltage range of an externally provided supply voltage on a power supply node;

activating a switchable current sinking circuit connected to the power supply node in response to the control voltage; and coupling the electrostatic discharge pulse to ground through a discharge path in the switchable current sinking circuit.

26. The method of claim 25 wherein the switchable current sinking circuit is a PMOS transistor and the control voltage is a negative potential.

27. The method of claim 25 wherein the switchable current sinking circuit is an NMOS transistor and the control voltage is a positive potential greater than a voltage which the power supply node becomes clamped.

* * * * *

UNITED STATES PATENT AND TRADEMARK OFFICE
CERTIFICATE OF CORRECTION

| | |
|---|---|
| PATENT NO. | : 6,008,970 |
| APPLICATION NO. | : 09/098829 |
| DATED | : December 28, 1999 |
| INVENTOR(S) | : Maloney et al. |

It is certified that error appears in the above-identified patent and that said Letters Patent is hereby corrected as shown below:

On the face page, in field (56), under "U.S. Patent Documents", in column 1, line 1, after "5,173,755" insert -- * --.

On the face page, in field (56), under "U.S. Patent Documents", in column 1, line 2, after "5,400,202" insert -- * --.

On the face page, in "Attorney, Agent, or Firm", in column 2, lines 1-2, delete "Schwegman, Lundberg Woessner & Kluth P.A." and insert -- Schwegman, Lundberg, Woessner & Kluth, P.A. --, therefor.

In column 7, line 28, in Claim 1, delete "adapted to provide" and insert -- provides --, therefor.

In column 7, line 43, in Claim 4, delete "adapted to provide" and insert -- provides --, therefor.

In column 7, line 65, in Claim 9, delete "for providing" and insert -- to provide --, therefor.

In column 8, line 2, in Claim 9, delete "adapted to provide" and insert -- provides --, therefor.

In column 8, line 11, in Claim 10, delete "for driving" and insert -- to drive --, therefor.

In column 8, line 19, in Claim 11, delete "cf" and insert -- of --, therefor.

In column 8, line 37, in Claim 12, delete "cf" and insert -- of --, therefor.

In column 8, line 45, in Claim 12, delete "for providing" and insert -- to provide --, therefor.

In column 8, line 64, in Claim 13, delete "rode" and insert -- node --, therefor.

In column 9, line 23, in Claim 16, delete "for providing" and insert -- to provide --, therefor.

In column 9, line 27, in Claim 16, delete "adapted to provide" and insert -- provides --, therefor.

In column 9, line 37, in Claim 17, delete "for driving" and insert -- to drive --, therefor.

UNITED STATES PATENT AND TRADEMARK OFFICE
CERTIFICATE OF CORRECTION

PATENT NO. : 6,008,970
APPLICATION NO. : 09/098829
DATED : December 28, 1999
INVENTOR(S) : Maloney et al.

It is certified that error appears in the above-identified patent and that said Letters Patent is hereby corrected as shown below:

In column 9, line 37, in Claim 17, delete "thc" and insert -- the --, therefor.

In column 9, line 40, in Claim 18, delete "an" and insert -- a --, therefor.

In column 10, line 14, in Claim 21, delete "for receiving" and insert -- to receive --, therefor.

In column 10, line 16, in Claim 21, delete "for performing" and insert -- to perform --, therefor.

In column 10, line 19, in Claim 21, delete "for providing" and insert -- to provide --, therefor.

In column 10, line 25, in Claim 21, delete "adapted to provide" and insert -- provides --, therefor.

Signed and Sealed this

Twenty-fourth Day of July, 2007

JON W. DUDAS
*Director of the United States Patent and Trademark Office*